United States Patent
Fujiwara (10) Patent No.: US 11,527,938 B2
(45) Date of Patent: Dec. 13, 2022

(54) ELECTRIC UNIT INCLUDING A MOTOR, CONTROL UNIT, COOLING FAN, AND A CASING, AND AN OPERATING MACHINE EQUIPPED WITH THE ELECTRIC UNIT

(71) Applicant: HONDA MOTOR CO., LTD., Tokyo (JP)

(72) Inventor: Kazuhisa Fujiwara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 197 days.

(21) Appl. No.: 16/640,170

(22) PCT Filed: Sep. 20, 2017

(86) PCT No.: PCT/JP2017/033851
§ 371 (c)(1),
(2) Date: Feb. 19, 2020

(87) PCT Pub. No.: WO2019/058439
PCT Pub. Date: Mar. 28, 2019

(65) Prior Publication Data
US 2020/0177052 A1 Jun. 4, 2020

(51) Int. Cl.
*H02K 5/20* (2006.01)
*H02K 9/06* (2006.01)
(Continued)

(52) U.S. Cl.
CPC .............. *H02K 9/06* (2013.01); *H02K 5/207* (2021.01); *H02K 11/0094* (2013.01);
(Continued)

(58) Field of Classification Search
CPC ........ H02K 1/2786; H02K 5/20; H02K 5/207; H02K 9/06; H02K 11/30; H02K 11/33;
(Continued)

(56) References Cited

U.S. PATENT DOCUMENTS

| 4,944,142 A * | 7/1990 | Sueshige ................ A01D 34/82 56/13.4 |
| 2003/0037525 A1* | 2/2003 | Iida ........................ A01D 69/02 56/11.9 |

(Continued)

FOREIGN PATENT DOCUMENTS

| EP | 1 285 570 A1 | 2/2003 |
| EP | 3 329 761 A1 | 6/2018 |

(Continued)

OTHER PUBLICATIONS

International Search Report, dated May 12, 2017, 2 pages.
European Search Report dated Jul. 15, 2020, English text, 10 pages.

*Primary Examiner* — Eric Johnson
(74) *Attorney, Agent, or Firm* — Rankin, Hill & Clark LLP (57) ABSTRACT

An electric unit is provided with: a motor having a stator and a rotor; a control unit that controls the motor; and a cooling fan that generates cooling wind for cooling the motor and the control unit. The control unit is provided in the upstream of the stator in a cooling flow channel for circulating the (Continued)

cooling wind. The cooling fan is provided to be positioned in the downstream of the motor in the cooling flow channel, the cooling fan generating the cooling wind by drawing air.

12 Claims, 9 Drawing Sheets

(51) Int. Cl.
*H02K 11/33* (2016.01)
*A01D 34/68* (2006.01)
*A01D 34/78* (2006.01)
*H02K 11/00* (2016.01)
*H02K 21/22* (2006.01)
*A01D 101/00* (2006.01)
*H02K 9/26* (2006.01)

(52) U.S. Cl.
CPC ............ *H02K 11/33* (2016.01); *H02K 21/22* (2013.01); *A01D 34/68* (2013.01); *A01D 34/78* (2013.01); *A01D 2101/00* (2013.01); *H02K 9/26* (2013.01)

(58) Field of Classification Search
CPC ........ H02K 21/22; A01D 34/78; A01D 34/68; A01D 2101/00
See application file for complete search history.

(56) References Cited

U.S. PATENT DOCUMENTS

| | | | |
|---|---|---|---|
| 2005/0035673 A1* | 2/2005 | Lafontaine | H02K 1/187 310/58 |
| 2010/0236845 A1 | 9/2010 | Ishii et al. | |
| 2014/0203675 A1 | 7/2014 | Maeda et al. | |
| 2015/0359170 A1 | 12/2015 | Ito et al. | |
| 2016/0014956 A1 | 1/2016 | Matsumoto et al. | |
| 2016/0338266 A1* | 11/2016 | Yamaoka | A01D 34/6806 |
| 2018/0146620 A1* | 5/2018 | Uchimi | A01D 69/02 |
| 2018/0226857 A1* | 8/2018 | Ishizaki | H02K 5/161 |

FOREIGN PATENT DOCUMENTS

| | | |
|---|---|---|
| JP | 2003-070168 | 3/2003 |
| JP | 3776773 | 3/2006 |
| JP | 2011-177094 | 9/2011 |
| JP | 2014-61880 | 4/2014 |
| JP | 2014-143833 | 8/2014 |
| JP | 2014-151415 | 8/2014 |
| JP | 2015-2688 | 1/2015 |
| JP | 2015-084699 | 5/2015 |
| JP | 2016-2030 | 1/2016 |

* cited by examiner

→ COOLING FLOW PATH (COOLING AIR)

→ COOLING FLOW PATH (COOLING AIR)

ELECTRIC UNIT INCLUDING A MOTOR, CONTROL UNIT, COOLING FAN, AND A CASING, AND AN OPERATING MACHINE EQUIPPED WITH THE ELECTRIC UNIT

TECHNICAL FIELD

The present invention relates to an electric unit equipped with a motor and a control unit adapted to control the motor.

BACKGROUND ART

An electric unit of this type is incorporated in a lawn mower, for example. In Japanese Patent No. 3776773, an electric lawn mower is proposed, which is equipped with a battery, a motor driven by electrical power from the battery, and a control unit for controlling the motor. With such an electric lawn mower, negative pressure is generated by rotation of a cutter blade provided on a shaft of the motor, outside air is taken into the cover as cooling air, and the cooling air is caused to flow sequentially in order of the battery, the control unit, and the electric motor, thereby cooling the battery, the control unit, and the electric motor.

Further, in Japanese Laid-Open Patent Publication No. 2015-084699, a pruning machine is disclosed in which outside air (cooling air) is guided to a motor by a cooling fan, which is fixed to the shaft of the motor, in order to cool the motor.

SUMMARY OF INVENTION

However, in Japanese Patent No. 3776773, since the cooling air is generated using rotation of the cutter blade for the purpose of cutting grass, for example, in the case that the amount of generated heat of the motor is comparatively large, cases may occur in which the electric motor cannot be sufficiently cooled.

Further, in Japanese Laid-Open Patent Publication No. 2015-084699, the arrangement of a control unit for controlling the motor is not described. Therefore, there is a concern that a control unit therein cannot be effectively cooled in relation to the motor.

The present invention has been devised taking into consideration the aforementioned problems, and has the object of providing an electric unit which is capable of effectively cooling a control unit and a motor.

In order to achieve the above object, an electric unit according to the present invention includes a motor having a stator and a rotor, a control unit configured to control the motor, and a cooling fan configured to generate cooling air for cooling the motor and the control unit, wherein the control unit is disposed on a more upstream side than the stator in a cooling flow path through which the cooling air flows.

In accordance with such a configuration, the cooling air generated by the cooling fan can be guided to the stator after having flowed to the control unit, which is lower in temperature than the stator. Consequently, the control unit and the motor can be effectively cooled.

In the above-described electric unit, the cooling fan may be disposed in a manner so as to be positioned on a more downstream side than the motor in the cooling flow path, and may generate the cooling air by drawing in air.

In accordance with such a configuration, it is possible for the cooling air to more smoothly flow toward the control unit and the motor, in comparison with a case in which, in the cooling flow path, the cooling fan is disposed on a more upstream side than the control unit is, in order to blow air.

In the above-described electric unit, there may further be provided a casing in which the motor is accommodated, the casing having an intake port and a discharge port.

In accordance with such a configuration, the motor can be protected by the casing. Further, the cooling air that has flowed into the casing from the intake port can be guided toward the control unit and the motor, and thereafter, flow out to the exterior of the casing from the discharge port.

In the above-described electric unit, the motor may be configured as an outer rotor type motor, the rotor and the control unit may face toward each other with a gap therebetween, and the intake port may be directed toward the gap.

In accordance with such a configuration, since the cooling air that flows in from the intake port can be uniformly guided to the gap between the control unit and the rotor, the control unit and the stator can be cooled in a uniform manner.

In the above-described electric unit, the cooling fan may be disposed on an opposite side of the motor from the control unit, and the discharge port may be disposed in the vicinity of the cooling fan.

In accordance with such a configuration, the cooling air that flows into the casing from the intake port can be made to flow smoothly to the exterior of the casing from the discharge port via the control unit and the motor.

In the above-described electric unit, a rotating body is configured to be connected to a shaft of the motor, and the electric unit may further include a shielding unit configured to block inflow of wind, which is generated by rotation of the rotating body, into the cooling fan.

In accordance with such a configuration, by the shielding unit, it is possible to suppress a change in the air volume, the air direction, etc., of the cooling air due to the wind generated by rotation of the rotating body. Consequently, it is possible to stably cool the control unit and the motor. Further, it is possible to suppress foreign matter from flowing into the cooling fan together with the wind generated by rotation of the rotating body.

In the above-described electric unit, there may further be provided a guide wall configured to guide the cooling air toward the discharge port.

In accordance with such a configuration, the cooling fan can be rotated in an efficient manner. Further, the cooling air inside the casing can be discharged smoothly from the discharge port.

In the above-described electric unit, there may further be provided a battery configured to supply electrical power to the motor, wherein the battery is disposed on a more upstream side than the control unit in the cooling flow path.

In accordance with such a configuration, even in the case that the temperature of the battery becomes comparatively high, the battery, the control unit, and the motor can be effectively cooled.

According to the present invention, because the control unit is disposed on a more upstream side than the stator in the cooling flow path of the cooling air that is generated by the cooling fan, the control unit and the motor can be effectively cooled.

DESCRIPTION OF EMBODIMENTS

Preferred embodiments of an electric unit according to the present invention in relation to operating machines in which the electric unit is incorporated will be described below with reference to the accompanying drawings.

Figure 1:
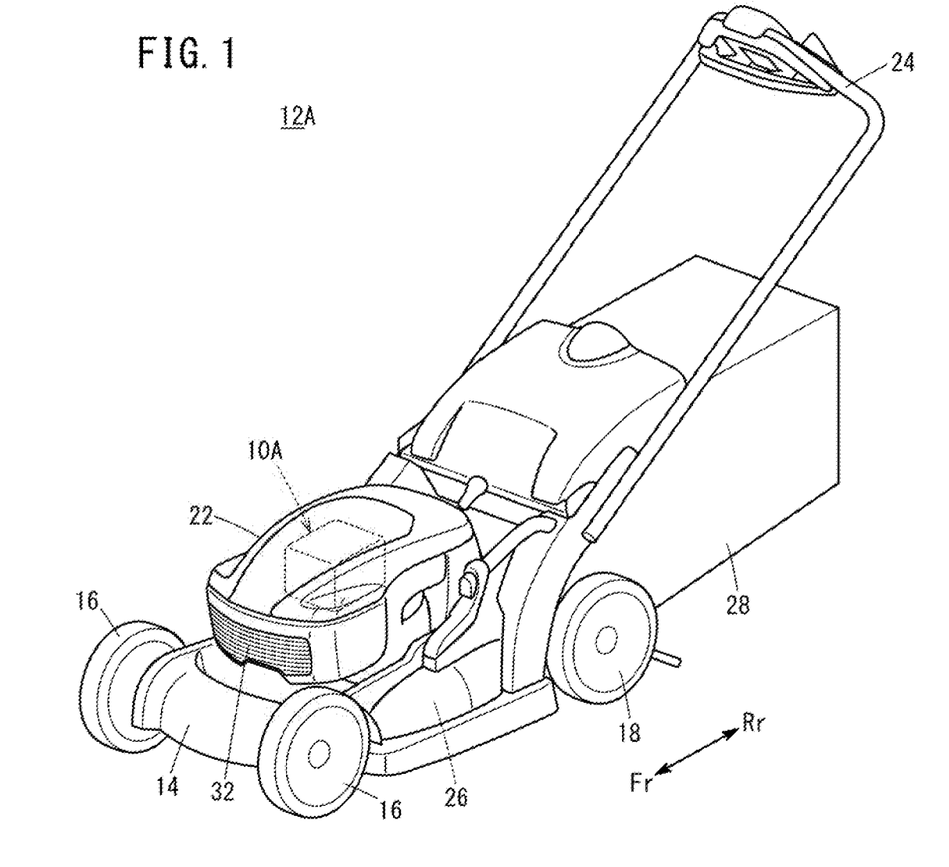
FIG. 1 is a perspective view of an operating machine (lawn mower) in which an electric unit is incorporated according to an embodiment of the present invention.

An operating machine equipped with the electric unit 10A according to the present embodiment shown in FIG. 1 is a walking type of lawn mower 12A for cutting grass. In FIGS. 1 to 5, the arrow Fr indicates a front direction of the lawn mower 12A (which is the same as the front direction as viewed from the perspective of an operator), and the arrow Rr indicates a rear direction of the lawn mower 12A (which is the same as the rear direction as viewed from the perspective of the operator).

Figure 2:
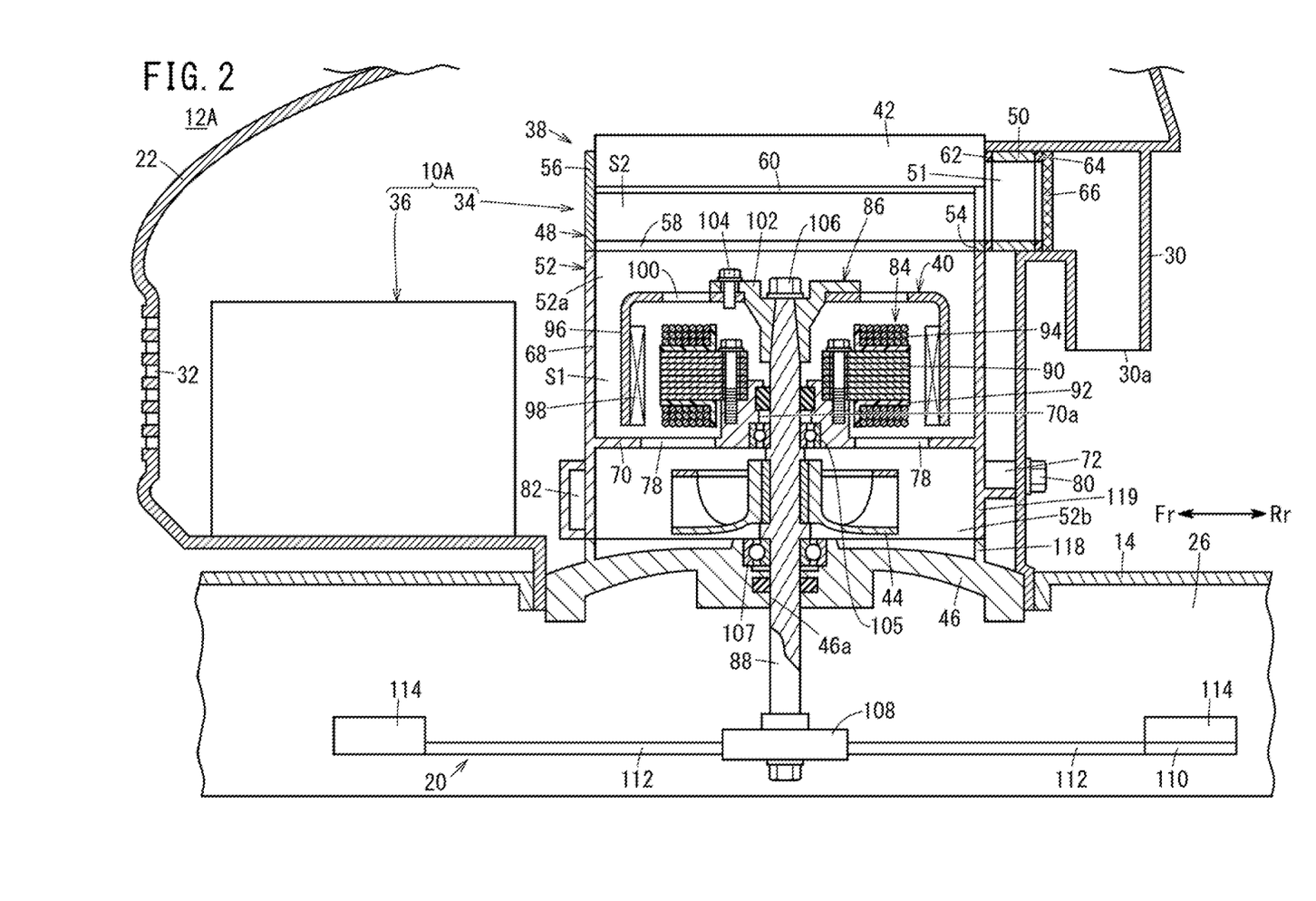
FIG. 2 is a vertical cross-sectional view of the electric unit of FIG. 1 and the periphery thereof.

As shown in FIGS. 1 and 2, the lawn mower 12A is equipped with a housing 14 constituting a machine body, left and right front wheels 16 arranged at a front portion of the housing 14, left and right rear wheels 18 arranged at a rear portion of the housing 14, a lawn mower cutter blade 20 accommodated inside the housing 14, a cover member 22 disposed on a top portion of the housing 14 and in which the electric unit 10A is accommodated, and an operating handle 24 which is extended in a rearward direction from the housing 14.

The lawn mower 12A is an electric lawn mower which is driven by electricity. More specifically, in the lawn mower 12A, the cutter blade 20 is made to rotate by the electric unit 10A, thereby mowing grass that exists below the lawn mower 12A. At this time, a flow of air (circling wind), which rotates in the same direction as the direction of rotation of the cutter blade 20, is generated in the housing 14. Additionally, by the circling wind, the grass that is cut by the cutter blade 20 is blown into and is accommodated in a cut grass accommodating body 28 through a cut grass conveyance passage 26 that is formed in the housing 14. In the housing 14, only a portion thereof facing toward the ground (lawn) is opened in a downward direction.

As shown in FIG. 2, on a rear portion of the cover member 22, an air introducing unit 30 is provided through which air is introduced into the interior of the cover member 22. An opening 30a of the air introducing unit 30 is oriented downward. Consequently, it is possible to prevent foreign matter such as grass or the like from entering into the cover member 22 via the air introducing unit 30.

On a front portion of the cover member 22, an air lead-out unit 32 is provided for guiding the air inside the cover member 22 to the exterior. The air lead-out unit 32 is configured by forming in a vertical direction a plurality of slits, which are extended in a lateral (left-right) direction of the lawn mower 12A (see FIGS. 1 and 2). Owing to this feature, it is possible to prevent exhaust from the cover member 22 from impinging on the operator. However, the air introducing unit 30 and the air lead-out unit 32 are not limited to the forms described above, and may be provided in any manner with respect to the cover member 22.

Figure 3:
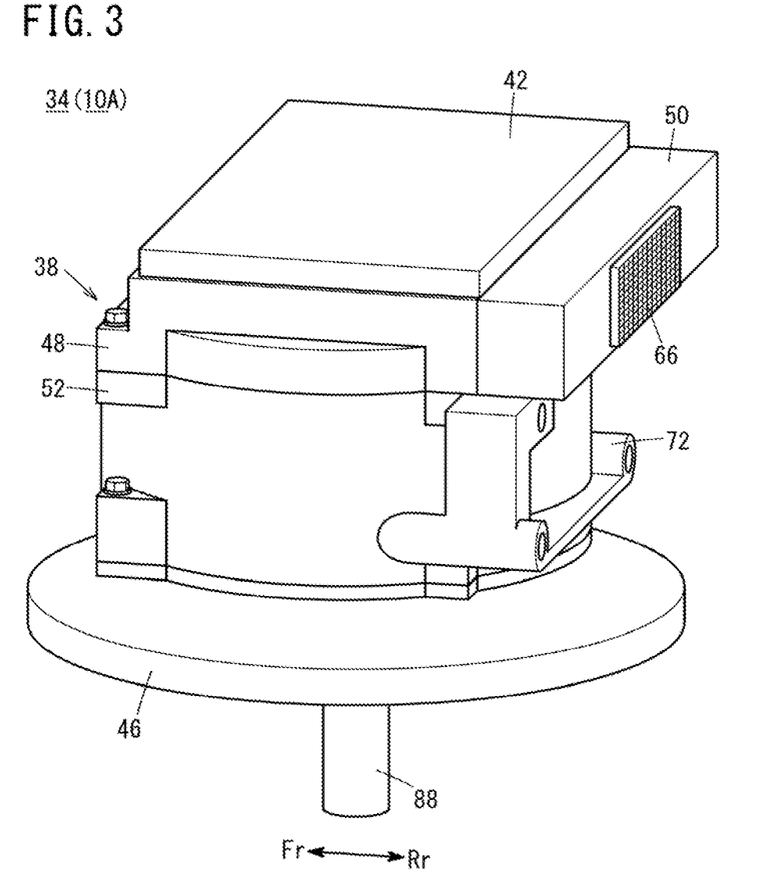
FIG. 3 is a perspective view of an electric unit main body shown in FIG. 2.
Figure 4:
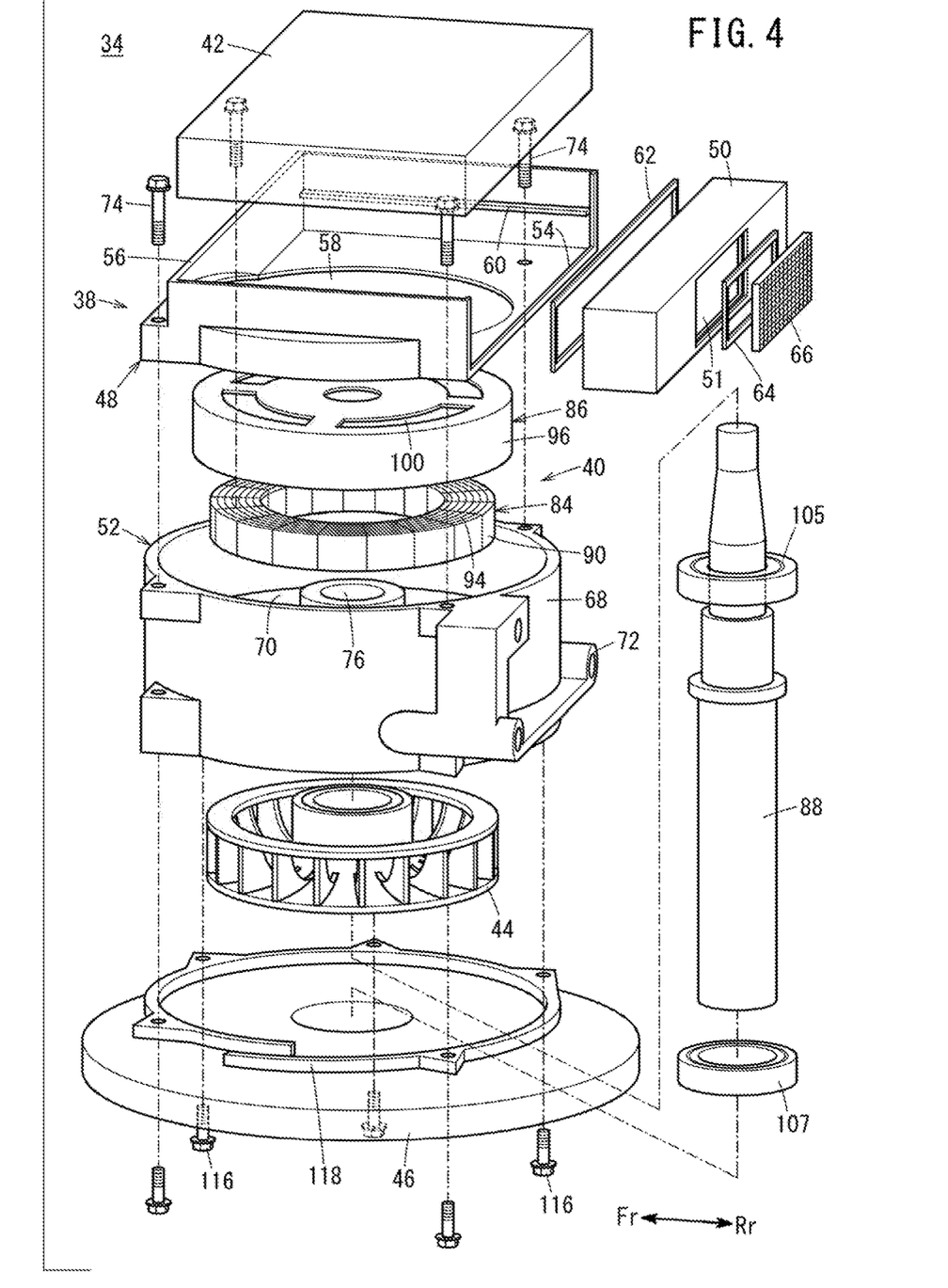
FIG. 4 is an exploded perspective view of the electric unit main body of FIG. 3.

In FIG. 2, the electric unit 10A is equipped with an electric unit main body 34 and a battery 36. As shown in FIGS. 2 to 4, the electric unit main body 34 includes a casing 38, a motor 40 accommodated in the casing 38, a control unit 42 adapted to control the motor 40, a cooling fan 44 that generates cooling air (air) for cooling the motor 40 and the control unit 42, and a shielding member 46 (shielding unit) provided on the casing 38.

The casing 38 includes a first casing 48 on which the control unit 42 is supported, an intake duct 50 provided in the first casing 48, and a cylindrically shaped second casing 52 in which a stator 84 of the motor 40 is supported. As shown in FIGS. 2 and 4, the first casing 48 includes a bottom portion 54 connected to the second casing 52, and side portions 56 disposed on the bottom portion 54. A circular hole 58 that communicates with the interior of the second casing 52 is formed in the center of the bottom portion 54. The side portions 56 are provided on three sides out of the four sides that constitute the outer shape of the bottom portion 54. On inner surfaces of the side portions 56, projecting portions 60 are formed, which support the control unit 42 in a state of being separated from the bottom portion 54.

The intake duct 50 is a square annular-shaped member constituting an intake port 51. The intake duct 50 is attached to a part of the bottom portion 54 where the side portions 56 are not provided. A seal member 62 is provided between the intake duct 50 and the first casing 48. A filter member 66 is mounted via a seal member 64 on an opposite side of the intake duct 50 from the first casing 48 (rearwardly of the lawn mower 12A). The intake port 51 communicates with an inner hole of the air introducing unit 30 via the filter member 66. The filter member 66 removes foreign matter such as moisture and dust or the like contained within the air that is guided from the air introducing unit 30.

The second casing 52 includes an outer circumferential wall portion 68 formed in a cylindrical shape, a supporting wall portion 70 provided on an inner circumferential surface of the outer circumferential wall portion 68, and attachment sections 72 provided on the outer circumferential wall portion 68. One end (an upper end) of the outer circumferential wall portion 68 is fixed to the bottom portion 54 of the first casing 48 by a plurality of bolts 74 (see FIG. 4). The supporting wall portion 70 is positioned in a middle part in the axial direction of the outer circumferential wall portion 68. An insertion hole 70a through which a shaft 88 of the motor 40 is inserted is formed in the supporting wall portion 70. Further, in the supporting wall portion 70, communication holes 78 (see FIG. 2) are formed that enable communication mutually between a first space 52a located above the supporting wall portion 70 (on a side of the first casing 48), and a second space 52b located below the supporting wall portion 70 (on a side opposite from the first casing 48) within the second casing 52.

As shown in FIGS. 2 to 4, a plurality of bolts 80 (see FIG. 2) for fixing the second casing 52 to the cover member 22 are threaded into the attachment sections 72. A discharge port 82 (see FIG. 2) through which the air inside the second casing 52 is discharged to the exterior is provided in a lower portion of the second casing 52.

In FIGS. 2 and 4, the motor 40 is configured as an outer rotor type motor. The motor 40 includes a stator 84 that is fixed to the supporting wall portion 70 of the second casing 52, a rotor 86 disposed rotatably with respect to the stator 84, and a shaft 88 that is fixed to the rotor 86. The motor 40 is arranged in a manner so that the axis of the shaft 88 extends in a vertical direction.

The stator 84 is configured in an annular shape, and is disposed in the first space 52a of the second casing 52. The stator 84 includes a stator core 90 in which a plurality of steel plates are stacked, insulators 92 disposed at the respective poles of the stator core 90, and a plurality of stator coils 94 wound around the insulators 92.

The rotor 86 includes a bottomed cylindrical rotor cup 96, and a plurality of permanent magnets 98 disposed on the rotor cup 96. The rotor cup 96 covers the outer circumferential surface of the stator core 90, and covers one surface (an upper surface) of the stator core 90 in the axial direction. A gap S1 through which air is capable of flowing is formed between the rotor cup 96 and the outer circumferential wall portion 68. The plurality of permanent magnets 98 are provided in a circumferential direction on the inner circumferential surface of the rotor cup 96. A plurality of through holes 100 through which air is introduced into the rotor cup 96 are formed on an upper surface of the rotor cup 96.

In FIG. 2, a boss member 102, which is disposed at one end (an upper end) of the shaft 88, is fixed by a rivet 104 to a central portion of the rotor cup 96. The boss member 102 is fixed to the shaft 88 by a nut 106.

The shaft 88 extends in a vertical direction in a manner so as to pass through the insertion hole 70a of the supporting wall portion 70, and an insertion hole 46a of the shielding member 46. The shaft 88 is rotatably supported by bearings 105, 107, which are fixed to wall surfaces that constitute the insertion holes 46a, 70a. The cutter blade 20, which is a rotating body, is connected via a blade holder 108 to another end (a lower end) of the shaft 88.

The blade holder 108 is attached to a central portion of the cutter blade 20, together with being coaxially connected to the shaft 88 at the lower end of the shaft 88. The cutter blade 20 includes a blade main body 112 that extends in a direction perpendicular to the axis of the shaft 88, together with blade portions 110 being provided at front edges in the direction of rotation thereof, and flaps 114 being attached to the blade main body 112 in a manner so that a flap angle thereof can be changed. The blade main body 112 is an elongated member (a so-called bar blade) in the form of a plate.

The control unit 42 and the rotor 86 are disposed in facing relation to each other with a gap S2 therebetween. The control unit 42 is a heat generating element having a non-illustrated control circuit board. The control unit 42 is spaced from the bottom portion 54 of the first casing 48. The intake port 51 is directed toward the gap S2 formed between the control unit 42 and the motor 40.

The cooling fan 44 is disposed in the second space 52b of the second casing 52. Stated otherwise, the cooling fan 44 is positioned on an opposite side of the motor 40 from the control unit 42 (i.e., below the stator 84). More specifically, the cooling fan 44 is disposed in a dead space below the stator 84. Consequently, by effectively utilizing the dead space, it is possible to reduce the size of the electric unit 10A as well as to reduce the number of parts thereof.

The cooling fan 44 is fixed coaxially with respect to the shaft 88. Therefore, the cooling fan 44 rotates integrally with the shaft 88. The cooling fan 44 is constituted as a so-called drawing-in type of cooling fan 44. By rotation thereof, the cooling fan 44 draws in air from the intake port 51, and thereby generates cooling air.

The cooling fan 44 is disposed so as to be positioned on a more downstream side than the motor 40 in the cooling flow path of the cooling air that flows from the intake port 51 toward the discharge port 82. In this case, the control unit 42 is disposed on a more upstream side than the stator 84 in the cooling flow path. The discharge port 82 is positioned in the vicinity of the cooling fan 44. More specifically, the discharge port 82 is located radially outward of the cooling fan 44.

Figure 6:
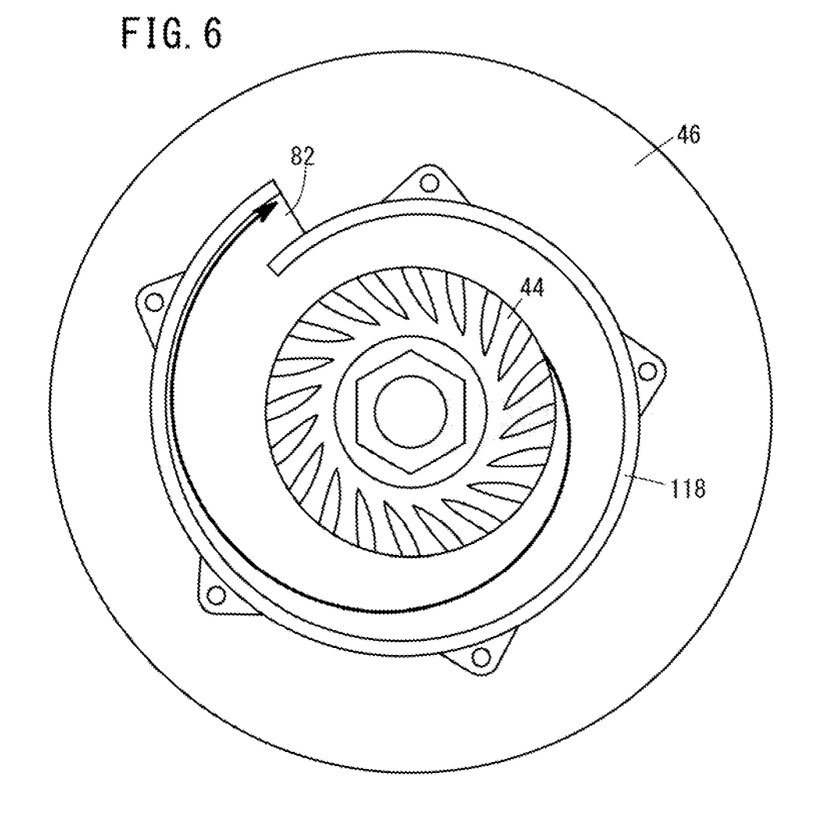
FIG. 6 is an explanatory diagram of a cooling flow path of a shielding member.

The shielding member 46 is fixed to the second casing 52 by a plurality of bolts 116 (see FIG. 4), so as to cover an opening on a lower side of the second casing 52 (on an opposite side thereof from the control unit 42). Owing to this feature, the shielding member 46 prevents wind (circling wind) generated by rotation of the cutter blade 20 from flowing into the cooling fan 44. In a central portion of the shielding member 46, an insertion hole 46a is formed through which the shaft 88 is inserted, and the bearing 107 is provided in the insertion hole 46a. In FIGS. 2, 4, and 6, on a surface (upper surface) of the shielding member 46 exposed to the second space 52b, a guide wall 118 is provided for guiding the air (cooling air) drawn into the cooling fan 44 to the discharge port 82.

The guide wall 118 extends radially outward in a gradually widening manner in the circumferential direction around the axis of the shaft 88. Stated otherwise, the guide wall 118 extends in a spiral shape. Moreover, a guide wall 119 having the same shape as the guide wall 118 (a spirally extending shape) is provided in a portion of the second casing 52 (on the side of the shielding member 46) below the supporting wall portion 70.

The battery 36 is a battery for supplying electrical power to the motor 40 and the control unit 42. The battery 36 is disposed between the second casing 52 and the air lead-out unit 32 in the interior of the cover member 22.

Next, operations of the electric unit 10A, which is configured as described above, will be explained in relation to operations of the lawn mower 12A.

Figure 5:
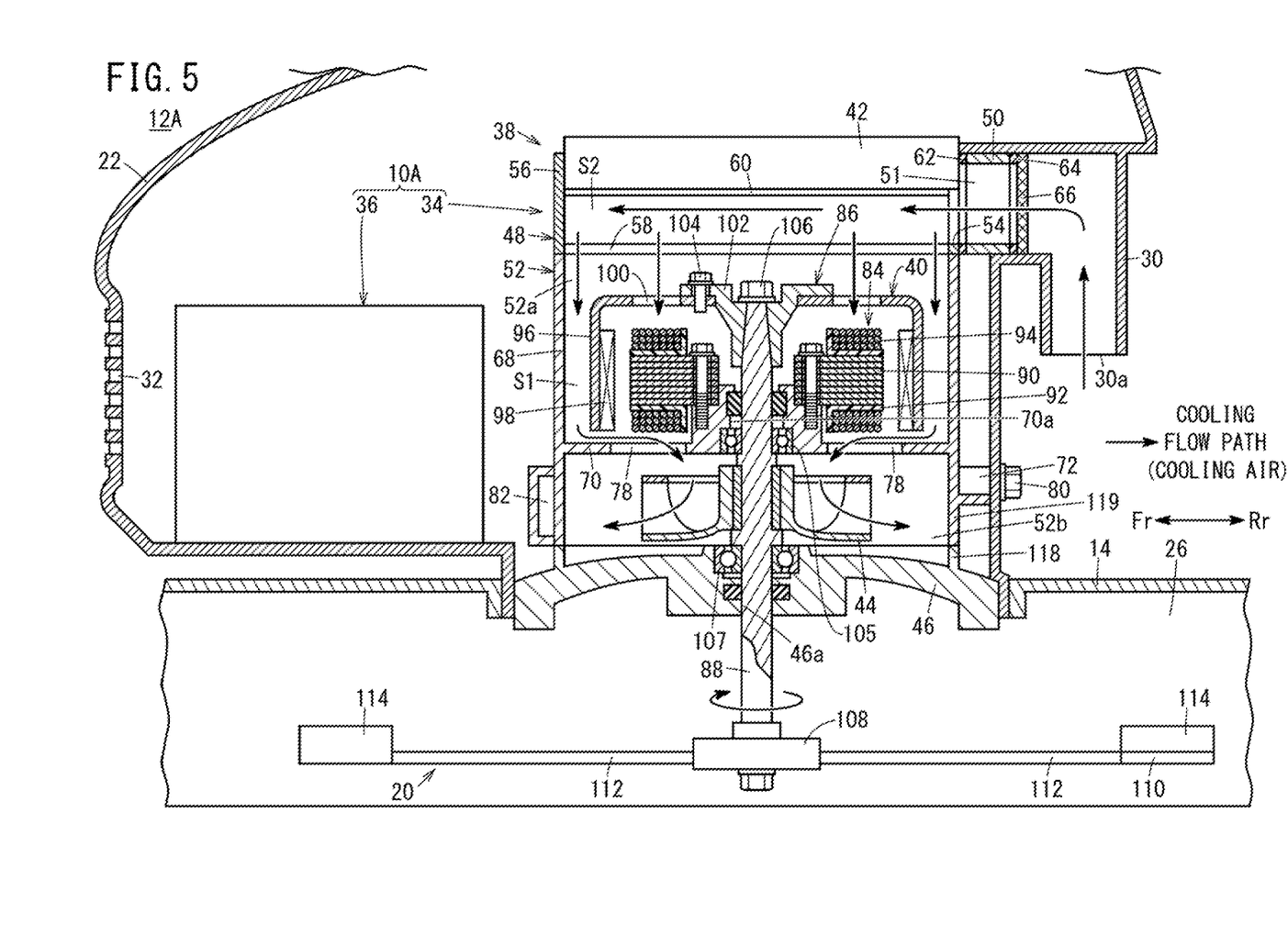
FIG. 5 is an explanatory diagram of a cooling flow path of the electric unit shown in FIG. 2.

In FIG. 5, when the rotor 86 rotates under the action of the battery 36, the cutter blade 20 connected to the shaft 88 rotates, and grass growing on the lawn directly below the lawn mower 12A is cut by the cutter blade 20. The lawn grass which has been cut (cut grass) is delivered into the cut grass accommodating body 28 via the cut grass conveyance passage 26 formed inside the housing 14, by the circling wind that is generated accompanying rotation of the cutter blade 20.

At this time, the battery 36, the control unit 42, and the motor 40 generate heat. More specifically, the control unit 42 becomes lower in temperature than the stator 84, while being higher in temperature than the battery 36. Stated otherwise, the stator 84 becomes highest in temperature. Further, when the cooling fan 44 is rotated by rotation of the shaft 88, outside air (air), which is guided from the air introducing unit 30 of the cover member 22, is drawn into the intake port 51 via the filter member 66. At this time, moisture, dust and the like contained within the air are removed by the filter member 66.

In addition, clean air (cooling air) that is guided via the filter member 66 into the intake port 51 flows through the gap S2 between the control unit 42 and the rotor 86. Consequently, the control unit 42 and the rotor 86 are cooled substantially at the same time by the cooling air. Then, the cooling air that has cooled the control unit 42 is guided into the first space 52*a* of the second casing 52.

The cooling air that was guided into the first space 52*a* passes through the through holes 100 of the rotor cup 96, flows between the stator 84 and the rotor 86, and the cooling air flows into the interior of the stator 84 (between the respective stator coils 94 that constitute the stator 84). Stated otherwise, the cooling air directly cools the stator coils 94 which generate the majority of heat inside the motor 40. Consequently, the interior of the motor 40 (the stator 84) is effectively cooled by the cooling air.

Further, the cooling air that was guided into the first space 52*a* flows downwardly through the gap S1 between the rotor cup 96 and the outer circumferential wall portion 68 of the second casing 52. Consequently, it is possible to effectively reduce the flow path resistance of the cooling air, and the flow rate of the cooling air that flows to the control unit 42 can be increased. Further, the outer side (rotor 86) of the motor 40 is effectively cooled by the cooling air.

The cooling air that has flowed respectively through the interior and the exterior of the rotor 86 merges together downwardly of the stator 84, and flows into the second space 52*b* via the communication holes 78 of the supporting wall portion 70. The cooling air that has flowed into the second space 52*b* is made to flow radially outward by the cooling fan 44, flows in a spiral shape along the guide wall 118, and is discharged from the discharge port 82 to the exterior of the casing 38.

The cooling air that is discharged to the exterior of the casing 38 flows along the cover member 22 toward the front of the lawn mower 12A, and is led outside of the cover member 22 from the air lead-out unit 32. Moreover, the battery 36 is cooled naturally, not by the cooling air but by dissipation of heat therefrom.

In this case, the electric unit 10A according to the present embodiment exhibits the following advantageous effects.

In the electric unit 10A, the control unit 42 is disposed on a more upstream side than the stator 84 of the motor 40 in the cooling flow path through which the cooling air generated by the cooling fan 44 flows. In accordance with this feature, the cooling air generated by the cooling fan 44 can be guided to the stator 84 after having flowed to the control unit 42, which is lower in temperature than the stator 84. Thus, the control unit 42 and the motor 40 can be effectively cooled.

The cooling fan 44 is disposed in a manner so as to be positioned on a more downstream side than the motor 40 in the cooling flow path, and generates the cooling air by drawing in air. Therefore, it is possible for the cooling air to more smoothly flow toward the control unit 42 and the motor 40, in comparison with a case in which the cooling fan 44 is disposed on a more upstream side than the control unit 42 in the cooling flow path in order to blow air.

The casing 38 accommodates the motor 40, and the intake port 51 and the discharge port 82 are formed therein. In accordance with this feature, the motor 40 can be protected by the casing 38. Further, the cooling air that has flowed into the casing 38 from the intake port 51 can be guided to the control unit 42 and the motor 40, and thereafter, flow out to the exterior of the casing from the discharge port 82.

The motor 40 is configured as an outer rotor type motor. In addition, the rotor 86 and the control unit 42 are disposed in facing relation to each other with the gap S2 therebetween, and the intake port 51 is directed toward the gap S2. In accordance with this feature, since the cooling air that has flowed in from the intake port 51 can be uniformly guided to the gap S2 between the control unit 42 and the motor 40, the control unit 42 and the stator 84 can be cooled in a uniform manner.

The cooling fan 44 is disposed on an opposite side of the motor 40 from the control unit 42, and the discharge port 82 is disposed in the vicinity of the cooling fan 44. In accordance with this feature, the cooling air that flows into the casing 38 from the intake port 51 can be made to flow smoothly to the exterior of the casing 38 from the discharge port 82 via the control unit 42 and the motor 40.

The cutter blade 20, which is a rotating body, is connected to the shaft 88 of the motor 40. In addition, the shielding member 46 prevents the circling wind generated by rotation of the cutter blade 20 from flowing into the cooling fan 44. In accordance with this feature, by the shielding member 46, it is possible to suppress a change in the air volume, the air direction, etc., of the cooling air due to the circling wind generated by rotation of the cutter blade 20. Accordingly, it is possible to stably cool the control unit 42 and the motor 40. Further, it is possible to suppress foreign matter such as lawn grass or the like from flowing into the cooling fan 44 together with the circling wind.

In the electric unit 10A, the guide walls 118, 119 are provided which guide the cooling air toward the discharge port 82. In accordance with this feature, the cooling air inside the casing 38 can be discharged smoothly from the discharge port 82.

The present invention is not limited to the above-described embodiment.

Figure 7:
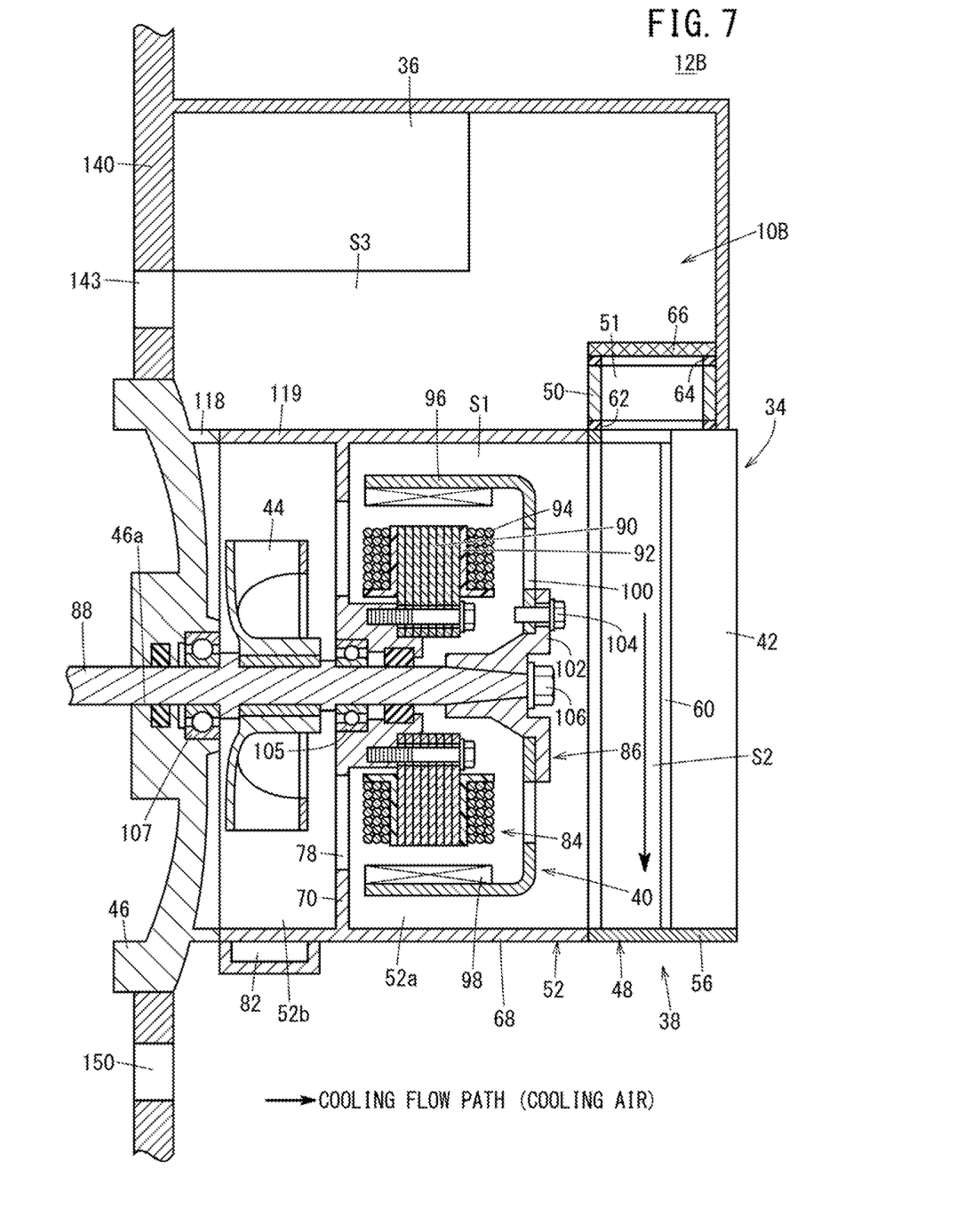
FIG. 7 is a longitudinal cross-sectional view with partial omission of an operating machine (for example, a cultivating machine) in which an electric unit is incorporated according to another embodiment of the present invention.
Figure 8:
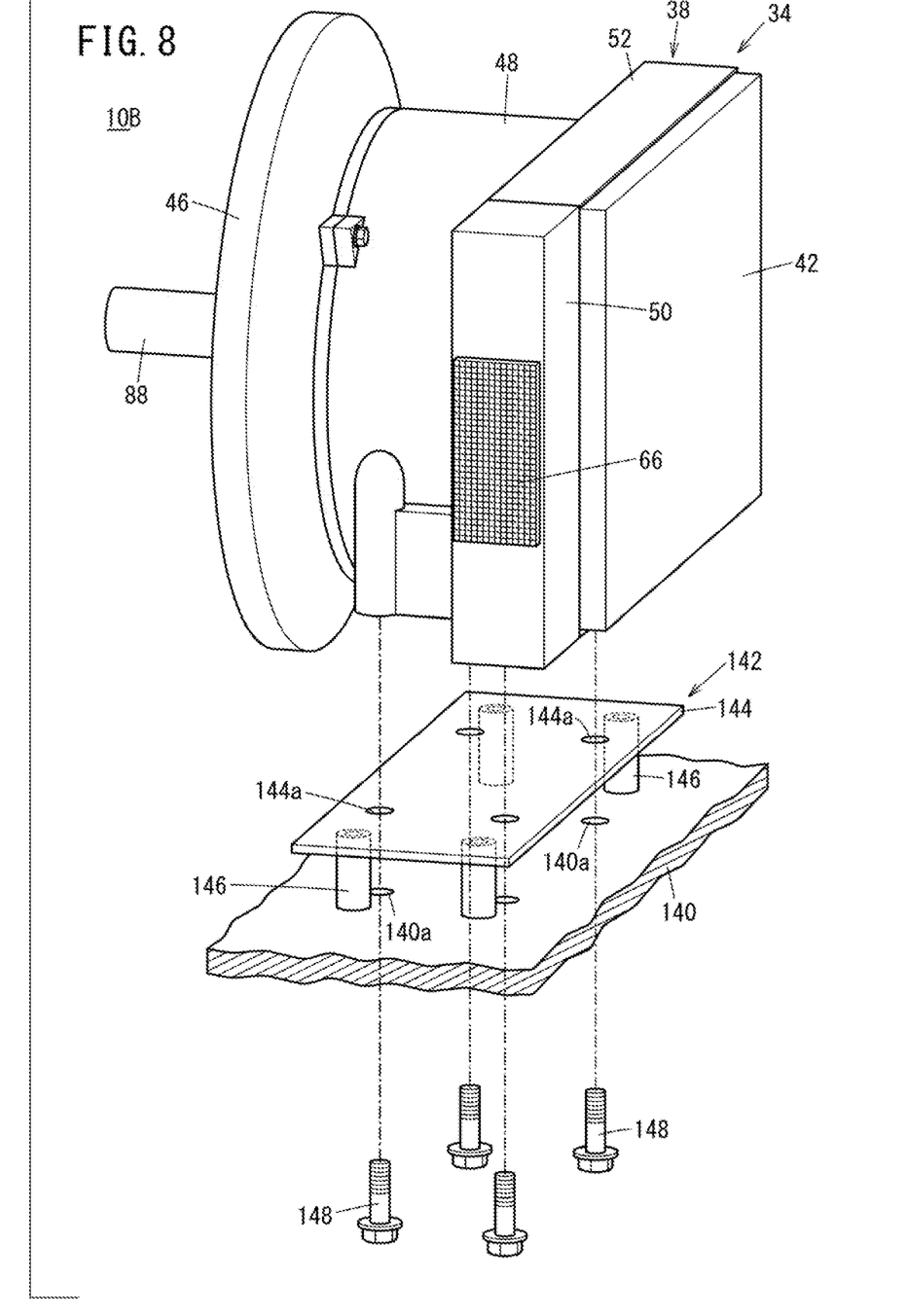
FIG. 8 is a perspective view of an electric unit main body and a mounting member shown in FIG. 7.

As shown in FIGS. 7 and 8, an electric unit 10B may be incorporated in a cover member 140 of a walking type cultivating machine 12B that serves as an operating machine, for example. In this case, the electric unit 10B is equipped with the electric unit main body 34, the battery 36, and a mounting member 142. The electric unit main body 34 is arranged in a manner so that the shaft 88 extends in a horizontal direction. Non-illustrated tilling claws are provided on a side of the shaft 88 opposite to a side where the rotor 86 is positioned. The battery 36 is arranged above the electric unit main body 34 with a gap S3 therebetween. An air introducing unit 143 of the cover member 140 is directed toward the gap S3 formed between the electric unit main body 34 (casing 38) and the battery 36. More specifically, the battery 36 is disposed on a more upstream side than the control unit 42 in the cooling flow path of the cooling air.

The mounting member 142 serves to fix the electric unit main body 34 to the cover member 140. The mounting member 142 is arranged between the electric unit main body 34 and the cover member 140. The mounting member 142 includes a plate-shaped mount main body 144, which is attached to the electric unit main body 34, and a plurality of bushes 146 arranged between the mount main body 144 and the cover member 140. In addition, by fastening a plurality of bolts 148, which are inserted through holes 140*a* of the cover member 140 and holes 144*a* of the mount main body 144, to the electric unit main body 34, the electric unit main body 34 is securely fixed to the cover member 140.

Figure 9:
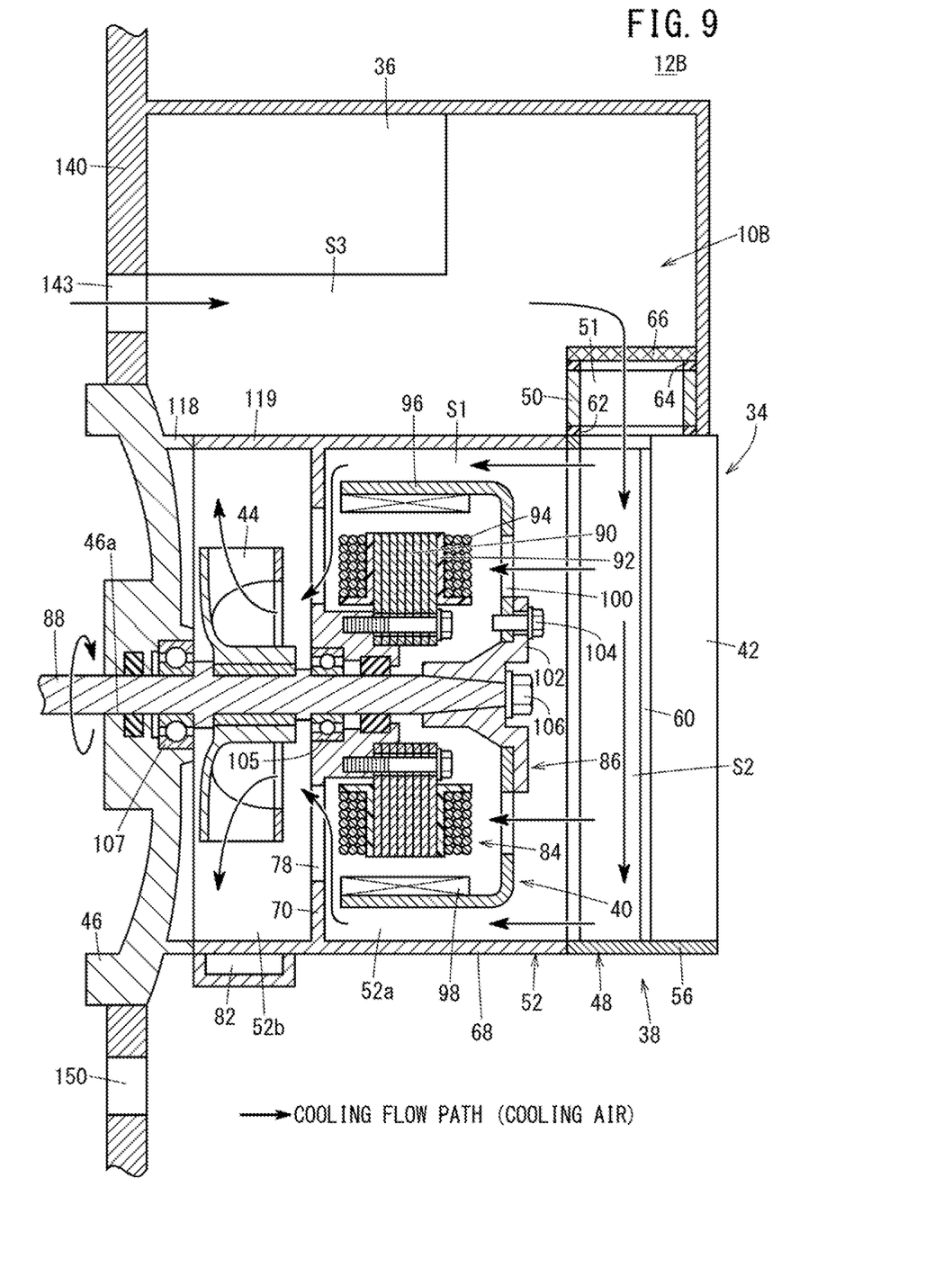
FIG. 9 is an explanatory diagram of a cooling flow path of the electric unit of FIG. 7.

As shown in FIG. 9, in this type of electric unit 10B, when the control unit 42 drives the motor 40 and the cooling fan 44 is rotated, outside air (air), which is introduced from the air introducing unit 143 of the cover member 140, flows as cooling air into the gap S3 between the battery 36 and the casing 38 of the electric unit main body 34. Consequently, the battery 36 is cooled by the cooling air. In addition, the cooling air that has cooled the battery 36 is guided via the filter member 66 and the intake port 51 into the gap S2 formed between the control unit 42 and the rotor 86.

Consequently, the control unit 42 and the stator 84 are uniformly cooled by the cooling air.

Thereafter, the cooling air is guided into the first space 52a, and cools the motor 40 by passing through the gap S1 formed between the rotor 86 and the casing 38 and also passing through the inner side (stator 84) of the rotor cup 96. The cooling air that has cooled the motor 40 is guided into the second space 52b, flows outward in a radial direction of the cooling fan 44, and is discharged to the exterior of the casing 38 via the discharge port 82. The cooling air that is discharged to the exterior of the casing 38 is led outside of the cover member 140 from an air lead-out unit 150 of the cover member 140.

In this case, the battery 36 is disposed on a more upstream side than the control unit 42 in the cooling flow path. Therefore, even in the case that the temperature of the battery 36 becomes comparatively high, the battery 36, the control unit 42, and the motor 40 can be effectively cooled.

The electric unit according to the present invention is not limited to the example of being incorporated in the lawn mower 12A and the cultivating machine 12B, as were described above, and for example, can be incorporated in an arbitrary direction in various operating machines, such as a high pressure washer, a transporting machine, a dozer, a rolling compactor, a portable aspirator (rescue pump), a rammer or the like.

The electric unit according to the present invention is not limited to the above-described embodiments, and it is a matter of course that various additional or alternative configurations could be adopted therein without departing from the essence and gist of the present invention as set forth in the appended claims.

DESCRIPTION OF REFERENCE NUMERALS 10A, 10B . . . electric unit
12A . . . lawn mower
20 . . . cutter blade (rotating body)
38 . . . casing
40 . . . motor
42 . . . control unit
44 . . . cooling fan
51 . . . intake port
82 . . . discharge port
84 . . . stator
86 . . . rotor

The invention claimed is:

1. An electric unit comprising:
a motor having a stator and a rotor;
a control unit configured to control the motor;
a cooling fan configured to generate cooling air for cooling the motor and the control unit; and
a casing including a first casing on which the control unit is supported, and a second casing in which the stator is supported in a state in which the second casing accommodates the motor and the cooling fan,
wherein
an axial end of the first casing facing away from the control unit is directly connected to an axial end of the second casing facing toward the control unit in an axial direction of the rotor,
the first casing is formed with an intake port,
the second casing is formed with a discharge port,
the motor is configured as an outer rotor type motor,
a circular hole is defined in an axial surface of the first casing at the axial end of the first casing facing away from the control unit, a cylindrical opening formed in the second casing and housing the stator and the rotor is opened in an axial surface of the second casing at the axial end of the second casing facing toward the control unit, the circular hole communicating directly with the cylindrical opening so that the rotor and the control unit face toward each other with a gap therebetween spanning the circular hole in the axial direction of the rotor,
the intake port is directed toward the gap,
the control unit is disposed on a more upstream side than the stator in a cooling flow path through which the cooling air flows, and
the cooling air flows downwardly through a space that is surrounded by the rotor and an outer circumferential wall portion of the second casing, the outer circumferential wall portion being disposed radially outward of the rotor so as to face the rotor.

2. The electric unit according to claim 1, wherein the cooling fan is disposed in a manner so as to be positioned on a more downstream side than the motor in the cooling flow path, and generates the cooling air by drawing in air.

3. The electric unit according to claim 1, wherein:
the cooling fan is disposed on an opposite side of the motor from the control unit; and
the discharge port is disposed in a vicinity of the cooling fan.

4. The electric unit according to claim 1, wherein:
a rotating body is configured to be connected to a shaft of the motor; and
further comprising a shielding unit configured to block inflow of wind, which is generated by rotation of the rotating body, into the cooling fan.

5. The electric unit according to claim 1, further comprising a guide wall configured to guide the cooling air toward the discharge port.

6. The electric unit according to claim 1, further comprising:
a battery configured to supply electrical power to the motor;
wherein the battery is disposed on a more upstream side than the control unit in the cooling flow path.

7. The electric unit according to claim 1, wherein the cooling air passes through a through hole that is provided in the rotor and flows between the stator and the rotor.

8. The electric unit according to claim 1, a diameter of the circular hole is larger than an outer diameter of the rotor.

9. An operating machine equipped with an electric unit, comprising:
a cover member accommodating the electric unit;
an air introducing unit provided in an interior of the cover member, air being introduced through the air introducing unit; and
an opening provided in the air introducing unit and oriented downward,
wherein the electric unit comprises:
a motor having a stator and a rotor;
a control unit configured to control the motor;
a cooling fan configured to generate cooling air for cooling the motor and the control unit; and
a casing including a first casing on which the control unit is supported, and a second casing in which the stator is supported in a state in which the second casing accommodates the motor and the cooling fan, and wherein
an axial end of the first casing facing away from the control unit is directly connected to an axial end of the second casing facing toward the control unit in an axial direction of the rotor, the first casing is formed with an intake port, the second casing is formed with a discharge port, the motor is configured as an outer rotor type motor, a circular hole is defined in an axial surface of the first casing at the axial end of the first casing facing away from the control unit, a cylindrical opening formed in the second casing and housing the stator and the rotor is opened in an axial surface of the second casing at the axial end of the second casing facing toward the control unit, the circular hole communicating directly with the cylindrical opening so that the rotor and the control unit face toward each other with a gap therebetween spanning the circular hole in the axial direction of the rotor, the intake port is directed toward the gap, the control unit is disposed on a more upstream side than the stator in a cooling flow path through which the cooling air flows, and the cooling air flows downwardly through a space that is surrounded by the rotor and an outer circumferential wall portion of the second casing, the outer circumferential wall portion being disposed radially outward of the rotor so as to face the rotor.

10. The operating machine according to claim 9, a diameter of the circular hole is larger than an outer diameter of the rotor.

11. An operating machine equipped with an electric unit, comprising:

a cover member accommodating the electric unit; and an air lead-out unit provided on the cover member, the air lead-out unit being configured by forming a plurality of slits, wherein the electric unit comprises:
a motor having a stator and a rotor;
a control unit configured to control the motor;
a cooling fan configured to generate cooling air for cooling the motor and the control unit; and
a casing including a first casing on which the control unit is supported, and a second casing in which the stator is supported in a state in which the second casing accommodates the motor and the cooling fan, and wherein
an axial end of the first casing facing away from the control unit is directly connected to an axial end of the second casing facing toward the control unit in an axial direction of the rotor, the first casing is formed with an intake port, the second casing is formed with a discharge port, the motor is configured as an outer rotor type motor, a circular hole is defined in an axial surface of the first casing at the axial end of the first casing facing away from the control unit, a cylindrical opening formed in the second casing and housing the stator and the rotor is opened in an axial surface of the second casing at the axial end of the second casing facing toward the control unit, the circular hole communicating directly with the cylindrical opening so that the rotor and the control unit face toward each other with a gap therebetween spanning the circular hole in the axial direction of the rotor, the intake port is directed toward the gap, the control unit is disposed on a more upstream side than the stator in a cooling flow path through which the cooling air flows, and the cooling air flows downwardly through a space that is surrounded by the rotor and an outer circumferential wall portion of the second casing, the outer circumferential wall portion being disposed radially outward of the rotor so as to face the rotor.

12. The operating machine according to claim 11, a diameter of the circular hole is larger than an outer diameter of the rotor.

* * * * *